US012738843B2

(12) United States Patent
Newlin

(10) Patent No.: US 12,738,843 B2
(45) Date of Patent: Sep. 15, 2026

(54) SELF-CALIBRATING SLOPE COMPENSATION IN MULTI-PHASE DC-DC CONVERTERS

(71) Applicant: NXP USA, Inc., Austin, TX (US)

(72) Inventor: Trevor Mark Newlin, Mesa, AZ (US)

(73) Assignee: NXP USA, Inc., Austin, TX (US)

( * ) Notice: Subject to any disclaimer, the term of this patent is extended or adjusted under 35 U.S.C. 154(b) by 446 days.

(21) Appl. No.: 18/392,315

(22) Filed: Dec. 21, 2023

(65) Prior Publication Data

US 2025/0211106 A1 Jun. 26, 2025

(51) Int. Cl.
*H02M 3/156* (2006.01)
*H02M 1/00* (2006.01)

(52) U.S. Cl.
CPC ......... *H02M 3/156* (2013.01); *H02M 1/0025* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS 7,265,530 B1 9/2007 Broach et al.
7,816,901 B2 * 10/2010 Wu ..................... H02M 3/1584 323/284
9,325,233 B2 * 4/2016 Bennett ................. H02M 3/158
9,379,621 B1 6/2016 Kalyanaranman et al.
9,442,140 B2 * 9/2016 Bansal ............... H02M 3/1584
(Continued)

FOREIGN PATENT DOCUMENTS

CN 111262436 B 4/2021

*Primary Examiner* — Jeffrey A Gblende

(57) ABSTRACT

Self-calibrating slope compensation in multi-phase DC-DC converters is discussed. In some embodiments, a slope compensation circuit comprises a reference generator configured to output a reference ramp and a bias signal, where the bias signal is usable by each of a plurality of ramp generators to provide a replica ramp to a power block of a multi-phase DC-DC converter; and control loop logic coupled to the reference generator and configured to produce a feedback signal based upon the reference ramp, where the reference generator is configured to modify a current of the bias signal based upon the feedback signal.

20 Claims, 6 Drawing Sheets

(56) References Cited

U.S. PATENT DOCUMENTS

| | | | |
|---|---|---|---|
| 10,848,048 | B2 | 11/2020 | Tanabe |
| 10,985,655 | B1 | 4/2021 | Romeo |
| 11,682,974 | B2 | 6/2023 | Philbrick et al. |

* cited by examiner 700
701
702
703
704
705
706
V (V)
TIME (μs)

SELF-CALIBRATING SLOPE COMPENSATION IN MULTI-PHASE DC-DC CONVERTERS

FIELD

This disclosure relates generally to electronic circuits, and more specifically, to self-calibrating slope compensation in multi-phase DC-DC converters.

BACKGROUND

An Integrated Circuit (IC) is a set of electronic circuits fabricated on a piece of semiconductor material (e.g., silicon). With the advent of modern semiconductor manufacturing techniques, an ever-increasing number of miniaturized transistors and other electronic components can be integrated into a single electronic package or microchip. Nowadays, a System-on-Chip (SoC) may include most (or all) components of an entire computer or data processing system.

An electronic device incorporating one or more ICs may be equipped with a DC-DC converter or regulator. A DC-DC converter is a circuit configured to receive a voltage from a power source and convert it into another voltage necessary for driving an IC. For example, a DC-DC converter may reduce a 5V supply to 1.8V, which may be more suitable to power a device's microprocessor. In some cases, the output of a DC-DC converter may be dynamically adjusted during its operation (e.g., to reduce an IC's power consumption).

In some implementations, a DC-DC converter may be single-phase, such that it produces a single Pulse-Width Modulation (PWM) signal to drive a single-phase power block. In other implementations, a DC-DC converter may be a multi-phase converter where two or more signals (with different phase shifts) drive a multi-phase power block. Multi-phase DC-DC converters are particularly useful in applications that require a regulated output voltage with high precision over a wide range of load conditions.

BRIEF DESCRIPTION OF THE DRAWINGS

The present disclosure is illustrated by way of example and are not limited by the accompanying figures, in which like references indicate similar elements. Elements in the figures are illustrated for simplicity and clarity and have not necessarily been drawn to scale.

DETAILED DESCRIPTION

The terms "DC-DC converter" or "DC-DC regulator," as used herein, refer generally to electric power converters that convert a source of direct current (DC) from one voltage to another. In electronic devices that contain different circuits or "loads" (e.g., processor, memory, peripherals, etc.) each circuit having its own voltage requirement (often different than the voltage level supplied by the device's battery), a DC-DC converter may be used to increase or decrease the voltage supplied to each circuit.

A "switching" DC-DC converter is a regulator that uses a switching element to transform the incoming power supply into a pulsed voltage (by turning on a switch until a desired voltage is reached and then turning it off, repeating the process at high speeds). In that context, voltage regulation describes the ability of a DC-DC converter to provide near constant voltage over a wide range of load conditions.

A single-phase switching DC-DC converter has a single voltage output. It produces a single Pulse-Width Modulation (PWM) signal which then drives a single power block. Conversely, in a multi-phase DC-DC converter, two or more PWM signals with different phase shifts are used to drive different power blocks. Each power block outputs a different phase. Furthermore, there are certain applications (e.g., automotive, etc.) where a multi-phase DC-DC converter is expected to maintain a constant phase margin at its output.

Figure 1:
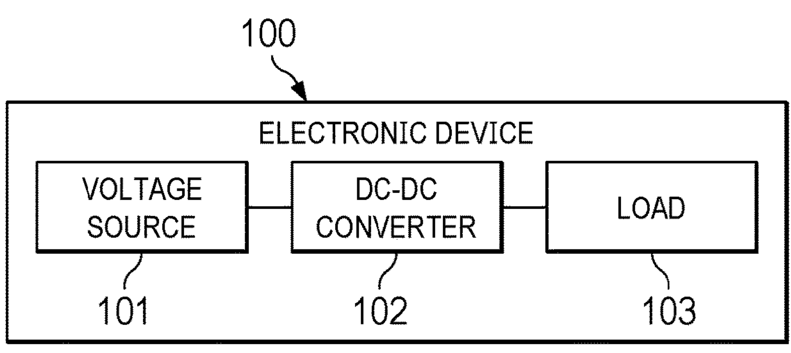
FIG. 1 is a block diagram of an example of an electronic device with a multi-phase DC-DC converter, according to some embodiments.

In that regard, FIG. 1 is a block diagram of an example of electronic device 100 with DC-DC converter 102. Particularly, electronic device 100 includes voltage or power source 101 and load 103 coupled to DC-DC converter 102. For example, voltage source 101 may include any DC source, such as a battery, power supply, or the like. Meanwhile, load 103 represents any electrical load, IC, or device (e.g., processors, controllers, memories, etc.)

In the case of step-down (or buck) regulation, for example, DC-DC converter 102 may include a pair of power switches which may be turned on and off to regulate an output voltage to load 103, such that the output voltage is less than the input voltage from source 101. More specifically, the power switches may be alternately turned on and off to generate a switching output voltage at a switching node. The switching node may be coupled to a filter circuit having an output inductor and capacitor to generate an output voltage having substantially constant magnitude. The output voltage may then be used to drive load 103.

When DC-DC converter 102 is a switching, multi-phase converter, a multi-phase PWM controller generates PWM signals with different phase shifts to drive a multi-phase power block, each clock signal driving a respective power block cell.

Ordinarily, each phase of DC-DC converter 102 would produce a PWM signal based on an independently generated ramp input signal, which would be very difficult, expensive, or practically impossible to synchronize across multiple phases at very high frequencies.

Using systems and methods described herein, however, DC-DC converter 102 may be configured to produce a single reference ramp locked to a reference clock using a self-calibrating slope compensation circuit. The self-calibrated, reference ramp may then be used to produce two or more PWM signals, which may in turn be distributed to different power blocks of DC-DC converter 102. Because multiple PWM signals may be produced from the single, self-calibrated reference ramp, the margins between the various phases of DC-DC converter 102 may be kept constant.

Although certain embodiments are described below in the context of multi-phase DC-DC converters, it should be noted that the systems and methods described herein are also applicable to single-phase DC-DC converters, or any other suitable converter or regulator.

Figure 2:
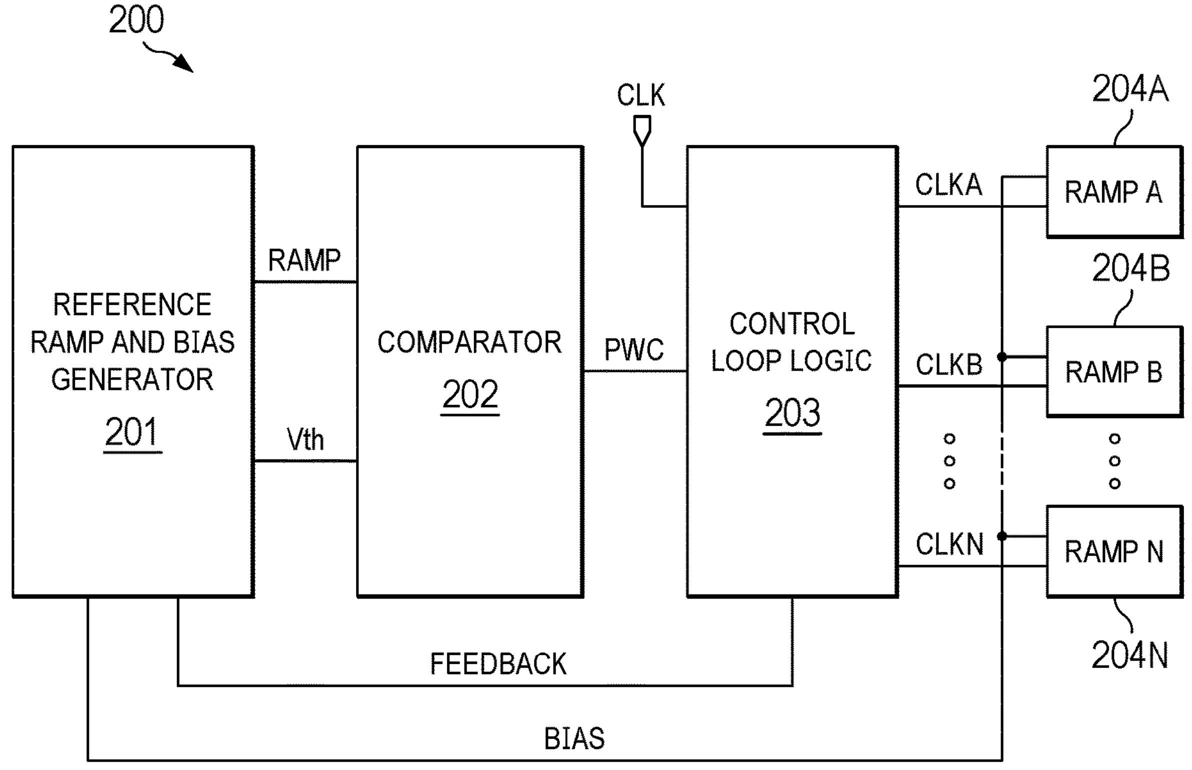
FIG. 2 is a block diagram of an example of a self-calibrating slope compensation system, according to some embodiments.

FIG. 2 is a block diagram of an example of self-calibrating slope compensation system 200. In various embodiments, system 200 may be part of DC-DC converter 102. Particularly, system 200 may be configured to produce one or more self-calibrating, constant slope, replica ramps usable by power cells within DC-DC converter 102 to supply each output phase of DC-DC converter 102. For example, each replica ramp may be usable to set a gain of a corresponding phase of DC-DC converter 102.

In self-calibrating, slope compensation system 200, reference ramp and bias generator ("reference generator") 201 provides a reference ramp and a voltage threshold ($V^{th}$) to PWM or calibration comparator 202.

Calibration comparator 202 may be implemented as any suitable PWM comparator configured to receive the reference ramp and $V^{th}$ from reference generator 201 and to output a reference PWM (PWC) signal in response thereto. When the reference ramp crosses voltage threshold $V^{th}$, the output of calibration comparator 202 goes from low to high, thus producing PWC, which is provided to control loop logic or circuitry 203.

Control loop logic 203 compares "PWC" with a main or system clock signal (clk) and derives a feedback signal (dh or dl) based on the comparison. The pulse width of the feedback signal may be proportional to a time error or discrepancy between "PWC" and "clk." Upon receiving the feedback signal, reference generator 201 may use the value of "dh" and "dl" to calibrate a current of a bias signal (vbias) provided to ramp generators 204A-204N, such that the current of "vbias" may be increased and reduced based upon respective assertions of "dh" and "dl," respectively.

Control loop logic 203 may also use the PWC signal to generate various clock signals (CLKA-CLKN) usable to trigger the PWM signals output at each phase of DC-DC converter 102. Each of "CLKA-CLKN" may be provided to a respective one of ramp generators 204A-204N.

Each of ramp generators 204A-204N uses "vbias" and "CLKA-CLKN" to produce a replica ramp usable by a PWM output stage (not shown). The PWM output stage uses these replica ramps to output corresponding PWM signals in each respective phase of DC-DC converter 102. Each PWM signal is applied to a respective phase of DC-DC converter 102 to power a respective load. Across multiple PWM signals produced by multiple ramp generators 204A-204N, the "on time" of those signals may be the approximately equal to achieve power balancing across phases.

Figure 3:
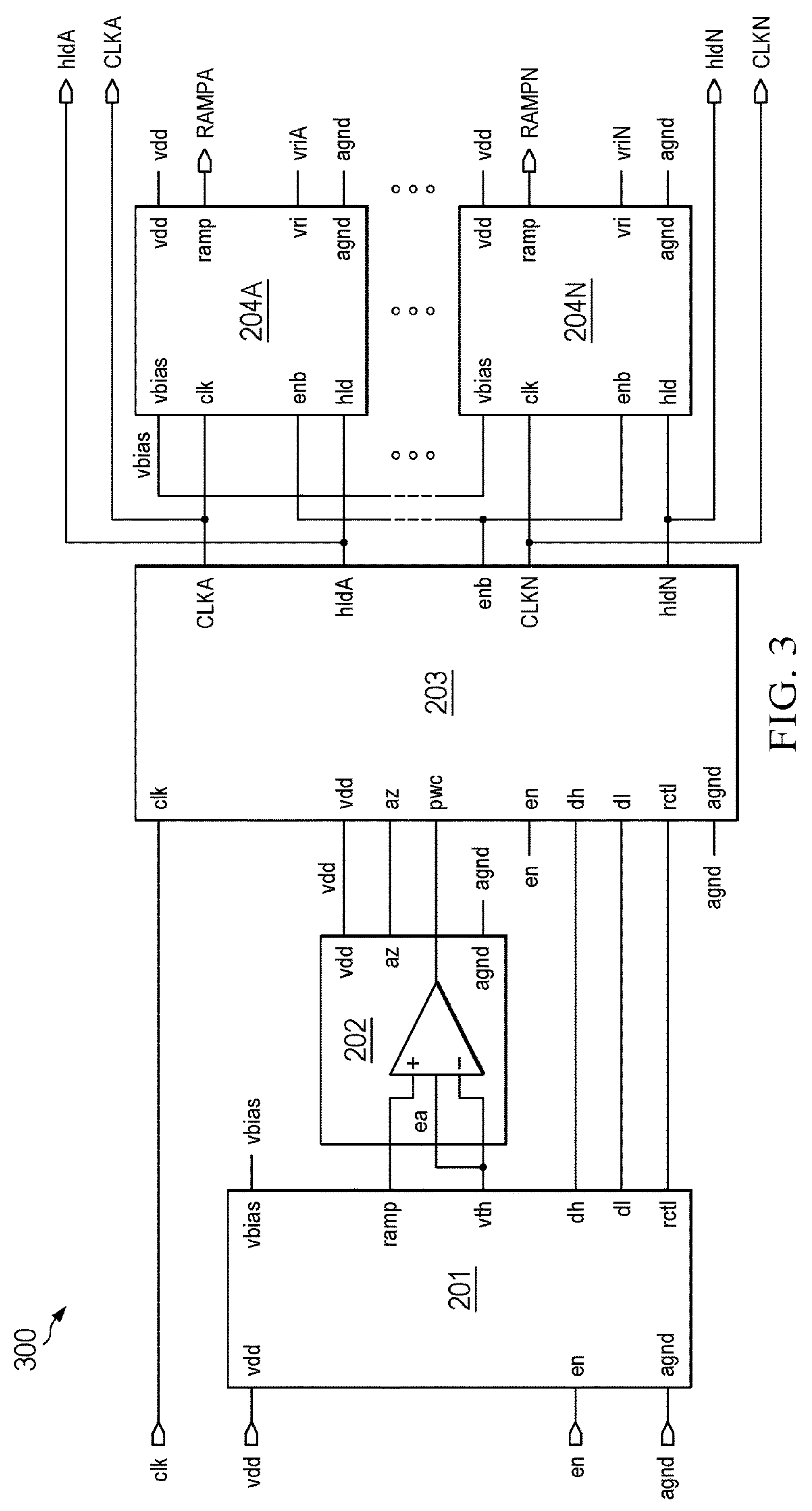
FIG. 3 is a circuit diagram of an example of a self-calibrating slope compensation circuit, according to some embodiments.

FIG. 3 shows circuit 300 as an example of self-calibrating slope compensation system 200. In various embodiments, circuit 300 may implement system 200 to produce a plurality of replica ramps, each ramp having a constant slope regardless of oscillator frequency, thus enabling untrimmed operation. Furthermore, each replica ramp may be used to drive a respective output phase of DC-DC converter 102.

Reference generator 201 may be implemented as IC or component configured to receive a supply voltage (VDD) and an enable signal (en). When "VDD" is present and "en" is asserted, reference generator 201 may output "vbias" to each ramp generator 204A-204N. Reference generator 201 may also provide a reference ramp and threshold voltage to calibration comparator 202.

In circuit 300, a closed/locked loop system triggered by "clk" may adjust "vbias" (an electrical current of the bias signal) to achieve a selected ramp amplitude. Specifically, reference generator 201 may receive "dh" or "dl" from control loop logic 203 usable to adjust "vbias," and it may assert a reset command (rctl) when appropriate. Each of components 201-204 may be coupled to the same ground terminal (agnd).

Calibration comparator 202 may receive the reference ramp and $V^{th}$ from reference generator 201 and output "PWC." Control loop logic 203 may be an IC or electronic component configured to receive "PWC" and compare "PWC" with "clk" when "VDD" is present and "en" is asserted.

In some implementations, calibration comparator 202 may be deployed as an auto-zero (az) amplifier. In other implementations, however, auto-zero features may be absent (e.g., if the offset is sufficiently small such that auto-zero is not required).

To adjust the current value of "vbias," control loop logic 230 may compare "PWC" with "clk" and, in response to a timing discrepancy between the two signals, it may provide feedback signals "dh" or "dl" to reference generator 201. Each of "dh" and "dl" may be implemented as a pulse having a width proportional to the timing discrepancy.

If reference generator 201 receives "dh," it may increase the value of "vbias" by an amount proportional to the width of that pulse. Conversely, if reference generator 201 receives "dl," it may reduce the value of "vbias" by an amount proportional to the width of that pulse.

In each of ramp generators 204A-204N, "vbias" may drive a capacitor (or capacitive element) usable to produce a corresponding replica ramp "RAMPA-RAMPN," and that capacitor may be of the same type/size as the capacitive element in reference generator 201 to compensate for propagation delays.

Control loop logic 203 may be coupled to each of ramp generators 204A-204N and configured to provide a respective one of "CLKA-CLKN" thereto, and to selectively assert a hold signal (hld). Within each ramp generator 204A-204N, "vbias" may be used to generate replica ramps "RAMPA-RAMPN," each of these ramps being triggered by a respective one of "CLKA-CLKN."

Moreover, "RAMPA-RAMPN" may be of the same type and size as the reference ramp output by reference generator 201. Because all replica ramps "RAMPA-RAMPN" are dynamically adjusted to "clk," circuit 300 may track frequency modulation or adjustments across every phase of DC-DC converter 102.

It should be noted that the closed loop of circuit 300 is absent from conventional DC-DC converters, which typically use digital dividers to adjust bias currents instead. In contrast, circuit 300 provides locked loop control of the "vbias" generation process such that the same bias may be used to produce as many constant slope, self-calibrated replica ramps as desired. As shown, circuit 300 may run on a single low voltage rail and it may be pre-biased to its maximum frequency (e.g., to prevent lock to half frequency).

For simplicity, the circuit diagrams that follow illustrate an example implementation of a two-phase DC-DC converter where two ramp signals "RAMPA" and "RAMPB" are produced by respective ramp generators 204A and 204B. It should be understood, however, that in other implementations these circuits may be modified to accommodate any number of phases, including a single phase.

Figure 4:
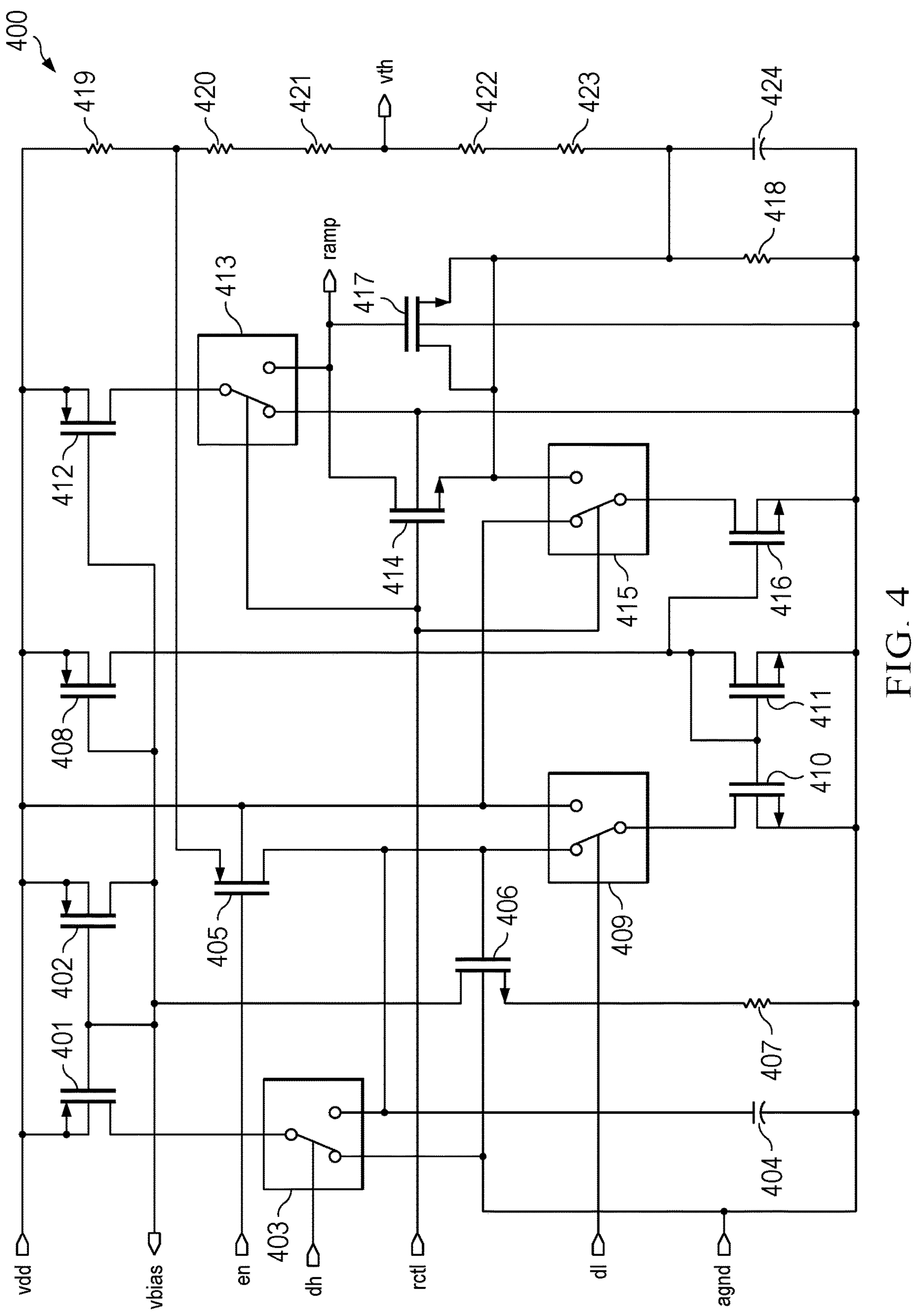
FIG. 4 is a circuit diagram of an example of a reference generator, according to some embodiments.

FIG. 4 shows diagram reference generator circuit 400, which may correspond to an example embodiment of reference generator 201 of FIG. 2. In this example, diagram 400 includes PMOS transistors 401, 402, 405, 408, and 412, NMOS transistors 406, 410, 411, 414, 416, and 417, switches or selectors 403, 409, 413, and 415, resistors 407 and 418-423, and capacitors 404 and 424, coupled as shown.

Also shown in diagram 400, "vbias" is coupled to the drain terminals of PMOS transistors 402 and 408, as well as to the gate terminals of PMOS transistors 402 and 412. "Dh" (usable to increase the value of "vbias") is coupled to switch 403, and "dl" (usable to reduce the value of "vbias") is coupled to switch 409. In operation, either "dh" or "dl" may be asserted at a given time. Both "dh" and "dl" are charge-controlling pulses, such that the larger the error between "PWC" and "clk," the wider the pulse.

Specifically, switch 403 may be used to increase the value of "vbias." Particularly, switch 403 controls the charging of capacitor 404 via application of "dh" at a control terminal of switch 403. The larger the error between "PWC" and "clk," the longer the duration of the "dh" pulse, which means more charge builds up in capacitor 404, thereby increasing the current of "vbias."

Conversely, switch 409 may be used to reduce the value of "vbias." Particularly, switch 409 controls discharging of capacitor 404 via application of "dl" at a control terminal of switch 409. The larger the error between "PWC" and "clk," the larger the "dl" pulse, thus resulting in a longer discharge period for capacitor and thereby reducing the current of "vbias."

Reference ramp generator 400 generates the reference ramp ("ramp"), at least in part, using (i.e., charging) capacitive element 417. Capacitive element 417 is illustrated here as an NMOS transistor with its source tied to its drain; but in other implementations it may be replaced with a conventional capacitor.

It should also be noted that switches 415 and 413 are used to enable equal and opposite currents to be applied to capacitive element 417, such that there is no net current flowing at source terminal of 417. In other embodiments, however, switches 415 and 413 may be left out.

Current source transistor 401 may control the rising rate of "vbias" to promote loop stability, and the current generated by transistor 406 may be fed into transistor 402 (in a diode configuration) to form a current mirror.

Figure 5:
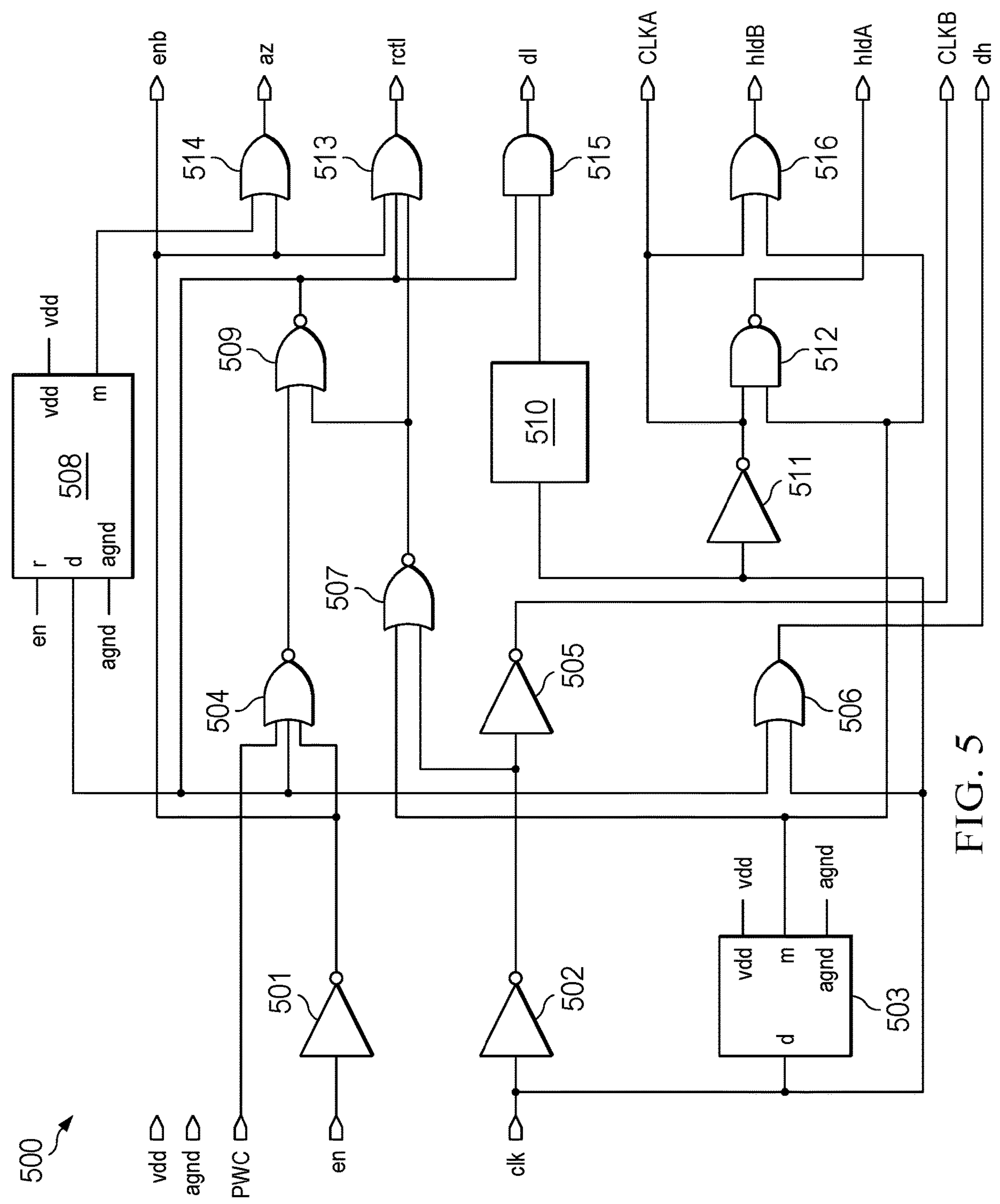
FIG. 5 is a circuit diagram of an example of a control loop logic, according to some embodiments.

FIG. 5 shows diagram control loop logic circuit 500, which may correspond to an example embodiment of control loop logic 203 of FIG. 2. In this example, diagram 500 includes plateau timer 503, auto-zero timer 508, and deglitch or delay block 510. Diagram 500 also includes inverters 501, 502, 505, and 511, NOR gates 504, 507, and 509, OR gates 506, 513, 514, and 516, NAND gate 512, and AND gate 515, coupled as shown.

In operation, auto-zero timer 508 may provide an output pulse (m) configured for automatically zeroing the circuit at the appropriate times. In cases where calibration comparator 202 is not an auto-zero amplifier, however, autozero timer 508 and OR gate 514 may be absent.

The control loop logic circuit of diagram 500 may be configured to generate a "rctl" output signal that may be asserted to indicate a reference ramp start, a "dh" feedback signal or pulse that may be asserted to indicate "vbias" is too low, a "dl" feedback signal or pulse that may be asserted to indicate "vbias" is too high, and two "hld" output signals ("hldA" and "hldB") that may be asserted to provide DC restore pulses.

De-glitch or delay block 510 may be implemented as a time delay circuit to ensure signals arrive at AND gate 515 at the same time; which is not typically required for the operation of OR gate 506. In this two-phase DC-DC converter example, two clock outputs "CLKA" and "CLKB" may be provided to ramp generators 204A and 204B, respectively, one to each corresponding phase.

Figure 6:
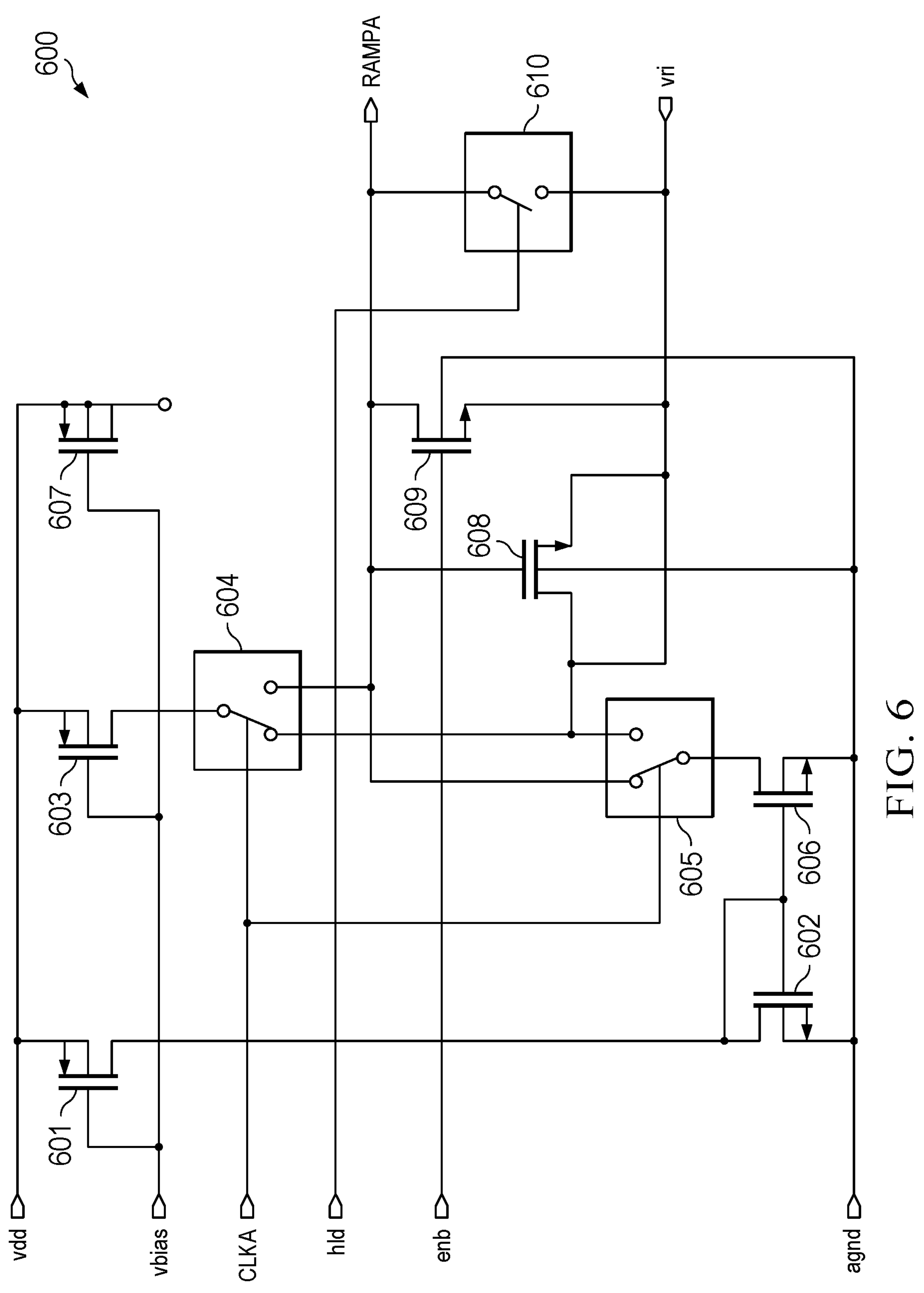
FIG. 6 is a circuit diagram of an example of a ramp generator, according to some embodiments.

FIG. 6 shows a diagram of an example of ramp generator circuit 600, which may be used as any of ramp generators 204A-204N of FIG. 2. In this example, circuit 600 includes PMOS transistors 601, 603, and 607, NMOS transistors 602, 606, 608, and 609, and switches or selectors 604, 605, and 610. Specifically, switch 604 may operate as a ramp-up switch, switch 605 as a ramp-down switch, and switch 610 as a DC restore switch. In other implementations, transistors 607 or 608 may be replaced by conventional capacitors.

Transistor 607 may operate as a capacitor (its source and drain terminals are tied together, such that the gate capacitance may be used in place of a capacitor) and it may be used as a filter configured to reduce noise in "vbias." In one or more other embodiments, a different capacitive element, such as a discrete capacitor, may be implemented in place of transistor 607.

The main current is provided by transistor 603, which is switched by "CLKA" and configured to charge transistor 608, also operating as a capacitive element. In other implementations, transistors 607 or 608 may be replaced by conventional capacitors.

In some embodiments, transistor 608 of ramp generator 204A may be another instance of the same device as transistor 417 in reference generator 201. More generally, the capacitance (and type of capacitance) provided by elements 417 and 608 may be the same.

When "RAMPA" is at the bottom of its ramp, DC restore switch 610 may be locked to "vri" (a voltage relative to a phase current). Particularly, "vri" may include a copy of the output current, as a voltage, usable to adjust the DC-position of RAMPA. The larger the output phase current, the larger the value of "vri" and the more the DC level of "RAMPA" rises.

In operation, circuit 600 may receive "vbias" and output its own replica ramp "RAMPA", which may then be provided to an output stage for power delivery to load 103 using any number of configured phases of DC-DC converter 102.

Figure 7:
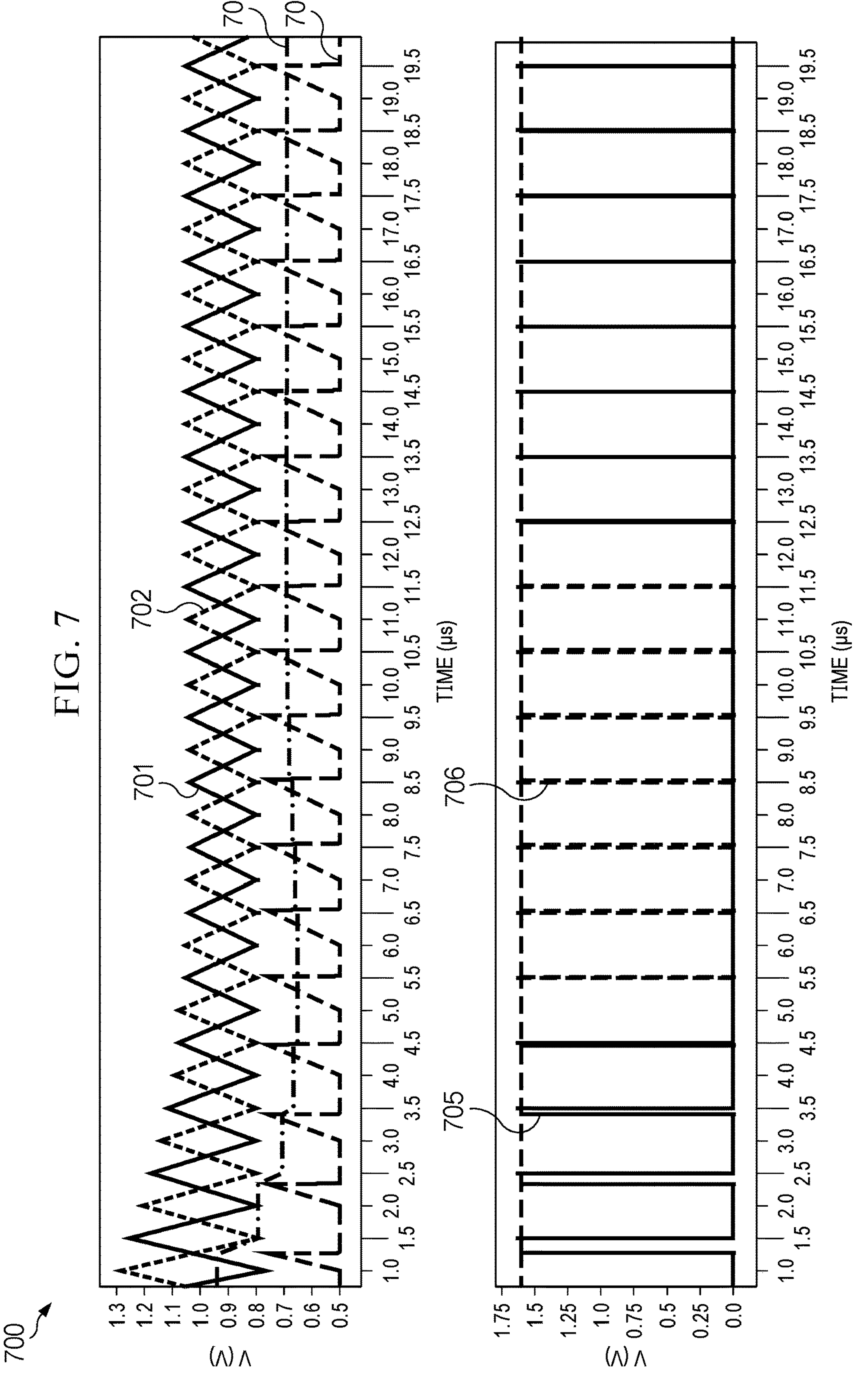
FIG. 7 are graphs illustrating results of the slope compensation techniques described herein, according to some embodiments.

FIG. 7 are graphs 700 illustrating results of the compensation techniques described herein. In the top graph, reference ramp 704 is produced by reference generator 201, based upon which calibration comparator 202 produces "PWC." First replica ramp 701 is produced by a first ramp generator 204A ("RAMPA") and second replica ramp 702 is produced by second ramp generator 204B ("RAMPB"). Curve 703 shows the voltage at the gate terminal of transistor 406.

Ramps 701, 702, and 704 have different DC components, but their amplitudes and slopes are identical (after an initial settling time). Trip points occur when reference ramp 701 changes direction, and the on-time of all ramps is equal to half of a clock ("clk") cycle (5 μs). Although in this case reference ramp 701 has a sawtooth waveform, in other implementations it may have a triangular waveform.

In the bottom graph, curve 705 shows the value of "dh" and curve 706 shows the value of "dl." In the beginning (e.g., at startup when time=0), replica ramps 701, 702 have not yet been calibrated. As circuit 200 beings to operate, however, control loop logic 203 outputs "dh" 705 and "dl" 706 pulses that enable reference generator 201 to gradually adjust the current of "vbias" such that, at about 4 μs, all ramps 701, 702, and 704 have the same amplitude and slope.

As such, curves 701-706 show that the techniques described herein may be used to produce multiple ramp signals with self-calibrating, slope compensation in DC-DC converter 102.

Accordingly, systems and methods described herein enable multi-phase DC-DC converter to produce a regulated output voltage at every phase, with high precision, and over any load conditions. These systems and methods are applicable, for example, in high performance switching applications with wide bandwidth. Although described in the context of multi-phase DC-DC converters, these systems and methods may also be applicable to single phase converter, multi-converter Power Management ICs (PMICs), precision Pulse-Frequency Modulation (PFM) systems, etc.

In some implementations, these systems and methods may be used for a dual-slope PWM control system with adjustable frequency, fixed ramp amplitude (locked to VDD), and usable to output two phases. These systems and methods may be used for a rising ramp (peak current mode) or a falling ramp (valley mode). Also, the ramp voltage reference does not have to be a fixed value but may instead be a division of the input supply voltage (e.g., to create a voltage feed forward solution).

In an illustrative, non-limiting embodiment, a slope compensation circuit may include a reference generator configured to output a reference ramp and a bias signal, where the bias signal is usable by each of a plurality of ramp generators to provide a replica ramp to a power block of a multi-phase DC-DC converter; and control loop logic coupled to the reference generator and configured to produce a feedback signal based upon the reference ramp, where the reference generator is configured to modify a current of the bias signal based upon the feedback signal.

In some implementations, the control loop logic may be coupled to the reference generator via a comparator, and the reference generator may be configured to output the reference ramp to the comparator. The comparator may be configured to provide, to the control loop logic, a reference PWM signal produced based, at least in part, upon the reference ramp. The reference generator may be configured to provide a threshold voltage value to the comparator, and the comparator may be configured to produce the reference PWM signal based, at least in part, upon the threshold voltage.

The control loop logic may be configured to produce the feedback signal based upon a timing difference between the reference PWM signal and a clock signal. The feedback signal may include a bias increase pulse or a bias decrease pulse having a pulse width proportional to the timing difference. The reference generator may be configured to charge a capacitive element based upon the pulse width of the bias increase pulse or the bias decrease pulse. The charge of the capacitive element may determine, at least in part, the current of the bias signal.

The control loop logic may be further configured to: produce a plurality of clock signals based, at least in part, upon the reference PWM signal, and provide each of the plurality of clock signals to a respective one of the plurality of ramp generators. Each of the plurality of clock signals may provide a different trigger point for each of the plurality of phases. Moreover, each of a plurality of replica ramps may set a gain of a corresponding power block of the multi-phase DC-DC converter.

In another illustrative, non-limiting embodiment, a device may include a load and a multi-phase DC-DC converter coupled to the load, where the multi-phase DC-DC converter comprises a slope compensation circuit having: a reference generator configured to output a reference ramp and a bias signal, where the bias signal is usable by each of a plurality of ramp generators to provide a replica ramp to a power block of a multi-phase DC-DC converter; and control loop logic coupled to the reference generator and configured to produce a feedback signal based upon the reference ramp, where the reference generator is configured to modify a current of the bias signal based upon the feedback signal.

In some cases, the reference generator may use a first capacitive element to generate the reference ramp, each ramp generator may use a second capacitive element to generate each replica ramp, and the first and second capacitive elements are of the same type and size.

The control loop logic may be coupled to the reference generator via a comparator, the reference generator may be configured to output the reference ramp to the comparator, and the comparator may be configured to provide, to the control loop logic, a reference PWM signal produced based, at least in part, upon the reference ramp.

The control loop logic may also be configured to produce the feedback signal based upon a timing difference between the reference PWM signal and a clock signal, such that the feedback signal comprises a bias increase pulse or a bias decrease pulse having a pulse width proportional to the timing difference.

The reference generator may be configured to charge a capacitive element based upon the pulse width, and the charge of the capacitive element may, at least in part, determine the current of the bias signal.

The control loop logic may be further configured to produce a plurality of clock signals based, at least in part, upon the reference PWM signal, and provide each of the plurality of clock signals to a respective one of the plurality of ramp generators, wherein each of the plurality of clock signals provides a respective trigger point for each of the plurality of phases.

In another illustrative, non-limiting embodiment, a method may include powering a load with a multi-phase DC-DC converter and controlling an output at each phase of the multi-phase DC-DC converter, at least in part, using a slope compensation circuit configured to produce a plurality of replica ramps, where each replica ramp is dynamically adjusted with respect to a reference ramp, and where each replica ramp is usable to control a gain of a PWM output produced by a respective phase of the multi-phase DC-DC converter.

The method may include using a first capacitive element to generate the reference ramp and a second capacitive element to generate each replica ramp, where the first and second capacitive elements are of the same type and size. The method may also include adjusting each replica ramp with respect to the reference ramp based, at least in part, upon a timing difference between the reference ramp and a clock signal. The method may further include producing a plurality of clock signals to provide trigger points for the plurality of phases.

In many implementations, systems and methods described herein may be incorporated into a wide range of electronic devices including, for example, computer systems or Information Technology (IT) products; consumer devices or appliances; scientific instrumentation; industrial robotics; medical or laboratory electronics; transportation vehicles such as automobiles, buses, trucks, trains, watercraft, aircraft, etc.; military equipment, etc.

For sake of brevity, conventional techniques have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although various systems and methods are described herein with reference to specific embodiments, modifications and changes may be made without departing from the scope of the present disclosure, as set forth in the claims below. Accordingly, the specification and figures are to be regarded in an illustrative rather than a restrictive sense, and all such modifications are intended to be included. Any benefits, advantages, or solutions to problems that are described herein regarding specific embodiments are not intended to be construed as a critical, required, or essential feature or element of any or all the claims.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A slope compensation circuit, comprising:

a reference generator configured to output a reference ramp and a bias signal, wherein the bias signal is usable by each of a plurality of ramp generators to provide a replica ramp to a power block of a multi-phase DC-DC converter; and control loop logic coupled to the reference generator and configured to produce a feedback signal based upon the reference ramp, wherein the reference generator is configured to modify a current of the bias signal based upon the feedback signal.

2. The slope compensation circuit of claim 1, wherein the control loop logic is coupled to the reference generator via a comparator, wherein the reference generator is configured to output the reference ramp to the comparator.

3. The slope compensation circuit of claim 2, wherein the comparator is configured to provide, to the control loop logic, a reference Pulse-Width Modulated (PWM) signal produced based, at least in part, upon the reference ramp.

4. The slope compensation circuit of claim 3, wherein the reference generator is configured to provide a threshold voltage value to the comparator, and wherein the comparator is configured to produce the reference PWM signal based, at least in part, upon the threshold voltage.

5. The slope compensation circuit of claim 3, wherein the control loop logic is configured to produce the feedback signal based upon a timing difference between the reference PWM signal and a clock signal.

6. The slope compensation circuit of claim 5, wherein the feedback signal comprises a bias increase pulse or a bias decrease pulse having a pulse width proportional to the timing difference.

7. The slope compensation circuit of claim 6, wherein the reference generator is configured to charge a capacitive element based upon the pulse width of the bias increase pulse or the bias decrease pulse, and wherein the charge of the capacitive element determines, at least in part, the current of the bias signal.

8. The slope compensation circuit of claim 3, wherein the control loop logic is further configured to:

produce a plurality of clock signals based, at least in part, upon the reference PWM signal; and provide each of the plurality of clock signals to a respective one of the plurality of ramp generators.

9. The slope compensation circuit of claim 8, wherein each of the plurality of clock signals provides a different trigger point for each of the plurality of phases.

10. The slope compensation circuit of claim 1, wherein each of a plurality of replica ramps sets a gain of a corresponding power block of the multi-phase DC-DC converter.

11. An electronic device, comprising:

a load; and a multi-phase DC-DC converter coupled to the load, wherein the multi-phase DC-DC converter comprises a slope compensation circuit having:

a reference generator configured to output a reference ramp and a bias signal, wherein the bias signal is usable by each of a plurality of ramp generators to provide a replica ramp to a power block of a multi-phase DC-DC converter; and control loop logic coupled to the reference generator and configured to produce a feedback signal based upon the reference ramp, wherein the reference generator is configured to modify a current of the bias signal based upon the feedback signal.

12. The electronic device of claim 11, wherein the reference generator uses a first capacitive element to generate the reference ramp, wherein each ramp generator uses a second capacitive element to generate each replica ramp, and wherein the first and second capacitive elements are of the same type and size.

13. The electronic device of claim 11, wherein the control loop logic is coupled to the reference generator via a comparator, wherein the reference generator is configured to output the reference ramp to the comparator, and wherein the comparator is configured to provide, to the control loop logic, a reference Pulse-Width Modulated (PWM) signal produced based, at least in part, upon the reference ramp.

14. The electronic device of claim 13, wherein the control loop logic is configured to produce the feedback signal based upon a timing difference between the reference PWM signal and a clock signal, and wherein the feedback signal comprises a bias increase pulse or a bias decrease pulse having a pulse width proportional to the timing difference.

15. The electronic device of claim 14, wherein the reference generator is configured to charge a capacitive element based upon the pulse width, and wherein the charge of the capacitive element determines, at least in part, the current of the bias signal.

16. The electronic device of claim 11, wherein the control loop logic is further configured to:

produce a plurality of clock signals based, at least in part, upon the reference PWM signal; and provide each of the plurality of clock signals to a respective one of the plurality of ramp generators, wherein each of the plurality of clock signals provides a respective trigger point for each of the plurality of phases.

17. A method, comprising:

powering a load with a multi-phase DC-DC converter; and controlling an output at each phase of the multi-phase DC-DC converter, at least in part, using a slope compensation circuit configured to produce a plurality of replica ramps, wherein each replica ramp is dynamically adjusted with respect to a reference ramp, and wherein each replica ramp is usable to control a gain of a Pulse-Width-Modulated (PWM) output produced by a respective phase of the multi-phase DC-DC converter.

18. The method of claim 17, further comprising using a first capacitive element to generate the reference ramp and a second capacitive element to generate each replica ramp, and wherein the first and second capacitive elements are of the same type and size.

19. The method of claim 17, further comprising adjusting each replica ramp with respect to the reference ramp based, at least in part, upon a timing difference between the reference ramp and a clock signal.

20. The method of claim 17, further comprising producing a plurality of clock signals to provide trigger points for the plurality of phases.

* * * * *